Sept. 14, 1926.
O. A. FRY
CLOSURE
Filed Nov. 23, 1925
1,599,706
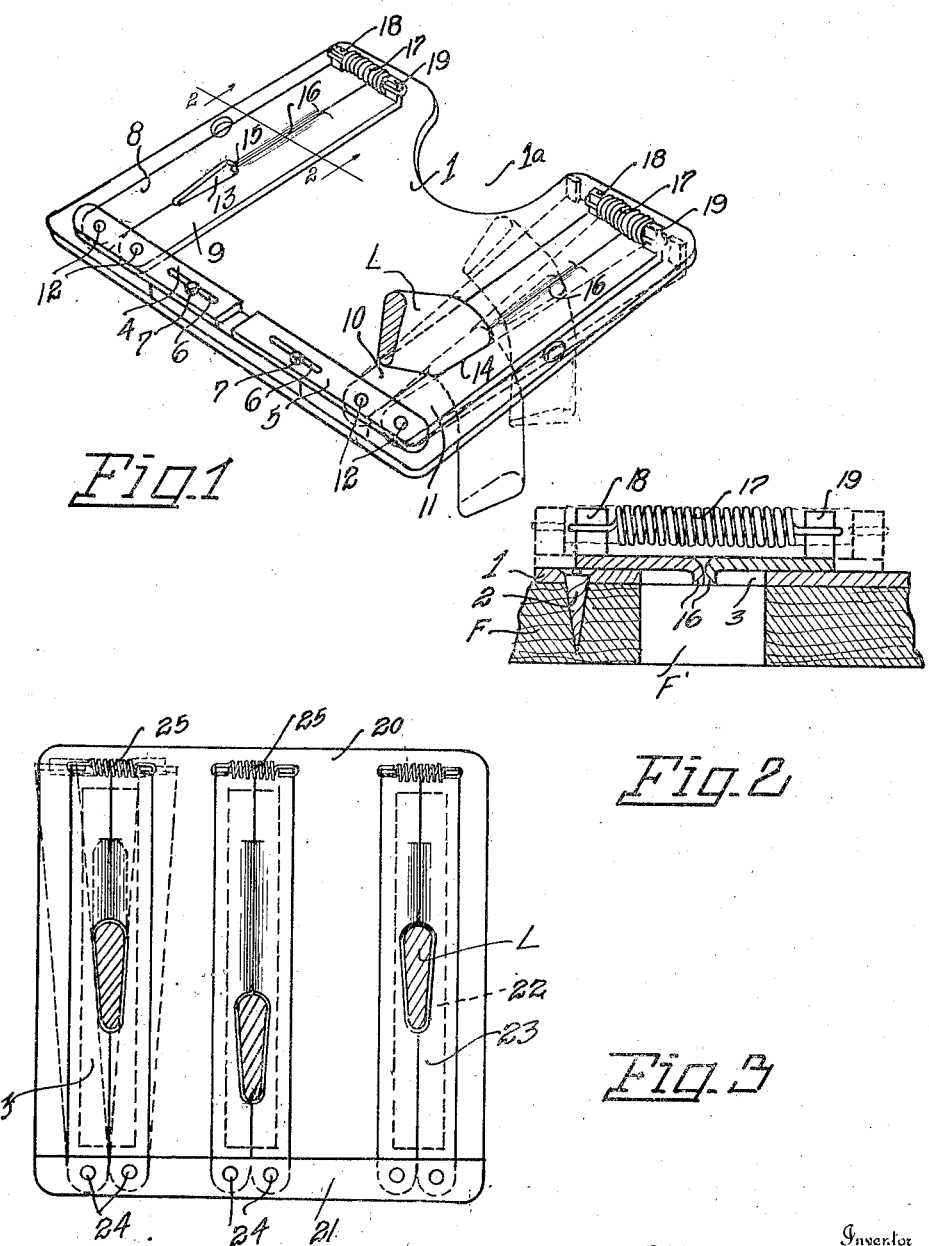
Otis A. Fry, Inventor
By Herbert E. Smith, Attorney Patented Sept. 14, 1926.

1,599,706

UNITED STATES PATENT OFFICE.

OTIS A. FRY, OF PARKWATER, WASHINGTON.

CLOSURE.

Application filed November 23, 1925. Serial No. 70,839.

My present invention relates to an improved closure for use as an accessory on the floor of automotive vehicles and designed for the purpose of normally closing the slots in the floor in which the pedal control levers move. As is well known, during the summer or warm seasons heated air currents from beneath the engine hood of an automobile pass through these slots, and during the colder seasons a draft of cold air passes through the slots, to the discomfort and inconvenience of the driver of the car. The primary purpose of my invention is the provision of means for normally closing these slots against the passage of air currents, and yet at the same time make proper provision for the required movements of the control or pedal levers.

To this end the invention consists in an attachment for the slotted floor of the car having a plurality of spring pressed closures complementary to the number of levers, which closures are positively opened by the working stroke of the control lever or pedal and are automatically closed as the spring-returned levers assume normal position. The attachment is adapted for use in different types of cars utilizing different numbers of control levers, and it is adjustable within limits for use with these levers, as will be described. The invention consists in certain novel combinations and arrangements of parts as will hereinafter be more fully set forth and claimed.

In the accompanying drawings I have illustrated two different adaptations of the physical embodiment of my invention wherein the parts are combined and arranged according to modes I have thus far devised for the practical application of the principles of my invention.

Figure 1 is a perspective view of the device, showing the relation thereto of one of the pedal levers and showing by dotted lines the operative position of the lever and an open closure device.

Figure 2 is an enlarged detail sectional view at line 2—2 of Figure 1.

Figure 3 is a top plan view of a device adapted for use with the Ford type of automobiles.

In order that the general relation of parts may readily be understood I have indicated a portion of the floor of a car as F with lever slots F' and the pedal levers are designated L.

In carrying out my invention I utilize a base plate 1 of metal or other suitable material which is of rectangular shape and provided with a notch or cut out part $1^a$ to adapt it for use on the floor of an automobile. The plate is secured to the upper surface of the floor by means of screws 2, and in Figure 1, where the attachment is designed for use with two levers or pedals L, two slots 3 are fashioned in the plate to correspond with the floor slots F', and permit movement of the levers.

At the rear end of the base plate a pair of transversely disposed supporting bars 4 and 5 are secured, each having a longitudinal slot 6, and bolts 7 are employed to secure the bars to base plate. By means of the slots these alined bars may be adjusted transversely of the base plate and automobile to accommodate the device to machines or cars in which the space varies between the two levers L. After the cross bars have properly been adjusted they are secured to the base plate by the bolts 7.

The outer free ends of the cross bars are elevated sufficiently above the base plate to accommodate two pairs of closure plates as 8 and 9 and 10 and 11 which are pivoted at 12 in complementary pairs and extend forward on the base plate to normally close the slots 3 and F' the former in the base plate and the latter in the floor F.

Near their pivoted ends the pairs of closure plates engage around the respective levers and for this purpose each pair of closure plates is fashioned with complementary notches 13 and 14 to form slots the walls of which slots clasp about the respective levers. At the rear ends of these slots their walls 15 are fashioned in such manner that pressure thereon by the front edge of a lever will push or force the closure plates to swing outwardly on their pivots 12 to permit the lever to be swung on its pivot for a working stroke. Adjacent to the slot between the closure plates they are fashioned with downturned flanges 16 which form wear faces on adjoining edges of the closure plates for frictional engagement against the sides of the lever as it swings forward or backward on its pivot. The adjoining edges of the complementary closure plates are normally in frictional contact and the walls of the notches are normally in frictional contact with the sides of the lever to effectively close the slots F' and 3 against passage of air currents.

At their free ends the pivoted closure plates are connected in pairs by springs 17 which are anchored at their ends to lugs 18 and 19 struck up from the ends of adjoining closure plates, and these springs which normally hold the closure plates in closed position, automatically return said plates to normal position after the lever has returned to its normal position.

In Figure 3 an attachment is illustrated that is specially designed for use with Ford automobiles where three levers L form the standard control devices. Here the rectangular base plate 20 is provided with a rear flange 21 to which the three pairs of closure plates 23 are pivoted as at 24, and springs 25 hold the plates closed over the rectangular slot 22 in the plate 20 and the corresponding floor slots of the automobile.

It will be apparent that the device may be applied with facility and adjusted with convenience to standard makes of automobiles, and that it is effective for the proper performance of its functions.

Having thus fully described my invention what I claim as new and desire to secure by Letters Patent is—

1. The combination with a slotted base plate of a pair of complementary, pivoted, closure plates adapted to close about a lever and adapted to be opened by positive movement of the lever, and a spring connecting the free ends of said plates to hold them in normal position.

2. The combination with a slotted base plate having an adjustable supporting bar thereon, of a pair of closure plates pivoted on said bar and adapted to close about a lever, and a spring connecting the free ends of said plates to hold them in normal position.

3. The combination with a slotted base plate having an adjustable bar, of a pair of notched closure plates pivoted on said bar and fashioned with wear faces on adjoining edges, and a spring connecting the free ends of said plates.

In testimony whereof I affix my signature.

OTIS A. FRY.